United States Patent
Dutta et al.

(10) Patent No.: US 8,280,127 B2
(45) Date of Patent: Oct. 2, 2012

(54) SYSTEM AND METHOD FOR THE ANALYSIS OF DIAGNOSTIC IMAGING DATA

(75) Inventors: Sandeep Dutta, Waukesha, WI (US);
Beth Heckel, Waukesha, WI (US);
Maria-Magdalena Nay, Paris (FR);
Sardar Gautham, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 1072 days.

(21) Appl. No.: 12/198,492

(22) Filed: Aug. 26, 2008

(65) Prior Publication Data
US 2010/0054554 A1    Mar. 4, 2010

(51) Int. Cl.
*G06K 9/00* (2006.01)
(52) U.S. Cl. ........................................ 382/128
(58) Field of Classification Search ............ 382/128, 382/131, 132
See application file for complete search history.

(56) References Cited

U.S. PATENT DOCUMENTS

| | | | |
|---|---|---|---|
| 2007/0019849 A1* | 1/2007 | Kaufman et al. | 382/128 |
| 2009/0185731 A1* | 7/2009 | Ray et al. | 382/131 |

* cited by examiner

*Primary Examiner* — Claire X Wang

(57) ABSTRACT

A system and method for analyzing three-dimensional image data are disclosed herein. The system includes a processor configured to generate an overview image of at least a portion of a patient. The processor is configured to generate a cross-sectional image including a cross-sectional view of the overview image. The processor is also configured to generate a statistical image showing a parameter value relating to the portion of the patient shown in the overview image. The system also includes a visual output device connected to the processor. The visual output device is configured to display the overview image, the cross-sectional image, and the statistical image generally simultaneously. Also, the overview image, the cross-sectional image, and the statistical image are interconnected such that an update, change, or input applied to any one of the images results in an update to one or more of the other images.

20 Claims, 3 Drawing Sheets

SYSTEM AND METHOD FOR THE ANALYSIS OF DIAGNOSTIC IMAGING DATA

FIELD OF THE INVENTION

This disclosure relates generally to a system and method for analyzing three-dimensional image data.

BACKGROUND OF THE INVENTION

For anatomical regions comprising an intricate branching structure, such as a lung or a group of blood vessels, it has typically been diagnostically useful to obtain information about the branching structure at a plurality of specific locations along the branching structure. For example, a radiologist may currently examine parameters such as a wall thickness, a lumen area, and a ratio of the wall area to the lumen area for studies involving the lung. Typically, it has been the responsibility of the radiologist to manually evaluate one or more locations in each individual branch in order to see if a parameter value falls within an expected range. By manually identifying locations where the parameter value is outside of the expected range, the radiologist is able to target the specific portions of the anatomical region that need to be investigated more closely.

However, as three-dimensional imaging modalities have improved, the amount of data for the radiologist to review and evaluate has drastically increased. It is no longer practical to have the radiologist manually check hundreds or even thousands of locations within a particular branching structure in order to see if the parameter value falls within the expected range. The problem is that current three-dimensional imaging modalities provide the radiologist with more information than can be efficiently processed by manual methods.

BRIEF DESCRIPTION OF THE INVENTION

The above-mentioned shortcomings, disadvantages and problems are addressed herein which will be understood by reading and understanding the following specification.

In an embodiment, a system for analyzing three-dimensional image data includes a processor configured to generate an overview image of at least a portion of a patient. The processor is configured to generate a cross-sectional image including a cross-sectional view of the overview image. The processor is also configured to generate a statistical image showing a parameter value relating to the portion of the patient shown in the overview image. The system also includes a visual output device connected to the processor. The visual output device is configured to display the overview image, the cross-sectional image, and the statistical image generally simultaneously. Also, the overview image, the cross-sectional image, and the statistical image are interconnected such that an update, change, or input applied to any one of the images results in an update to one or more of the other images.

In an embodiment, a system for analyzing three-dimensional image data includes a processor configured to generate an overview image including a branching anatomical structure. The processor is configured to generate a cross-sectional image including a cross-sectional view of the overview image. The processor is also configured to generate a statistical image comprising a representation of a parameter value at a plurality of locations in the branching anatomical structure. The system includes a visual output device connected to the processor. The visual output device is configured to display the overview image, the cross-sectional image, and the statistical image generally simultaneously. Also, the overview image, the cross-sectional image, and the statistical image are interconnected such that an update, change, or input applied to any one of the images results in an update to one or more of the other images.

In another embodiment, a method of analyzing pulmonary image data for disease includes displaying a pulmonary tree image representing a portion of a lung. The method includes displaying a cross-sectional image at generally the same time as the pulmonary tree image. The cross-sectional image includes a cross-sectional view of the pulmonary tree image. The method includes displaying a scatter plot image at generally the same time as the pulmonary tree image and the cross-sectional image. The scatter plot image includes a plurality of points and each of the plurality of points represents a parameter value at a specific location in the portion of the lung. The method also includes selecting a location of interest on any one of the pulmonary tree image, the cross-sectional image, and the scatter plot image and automatically updating one or more of the other images.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1:
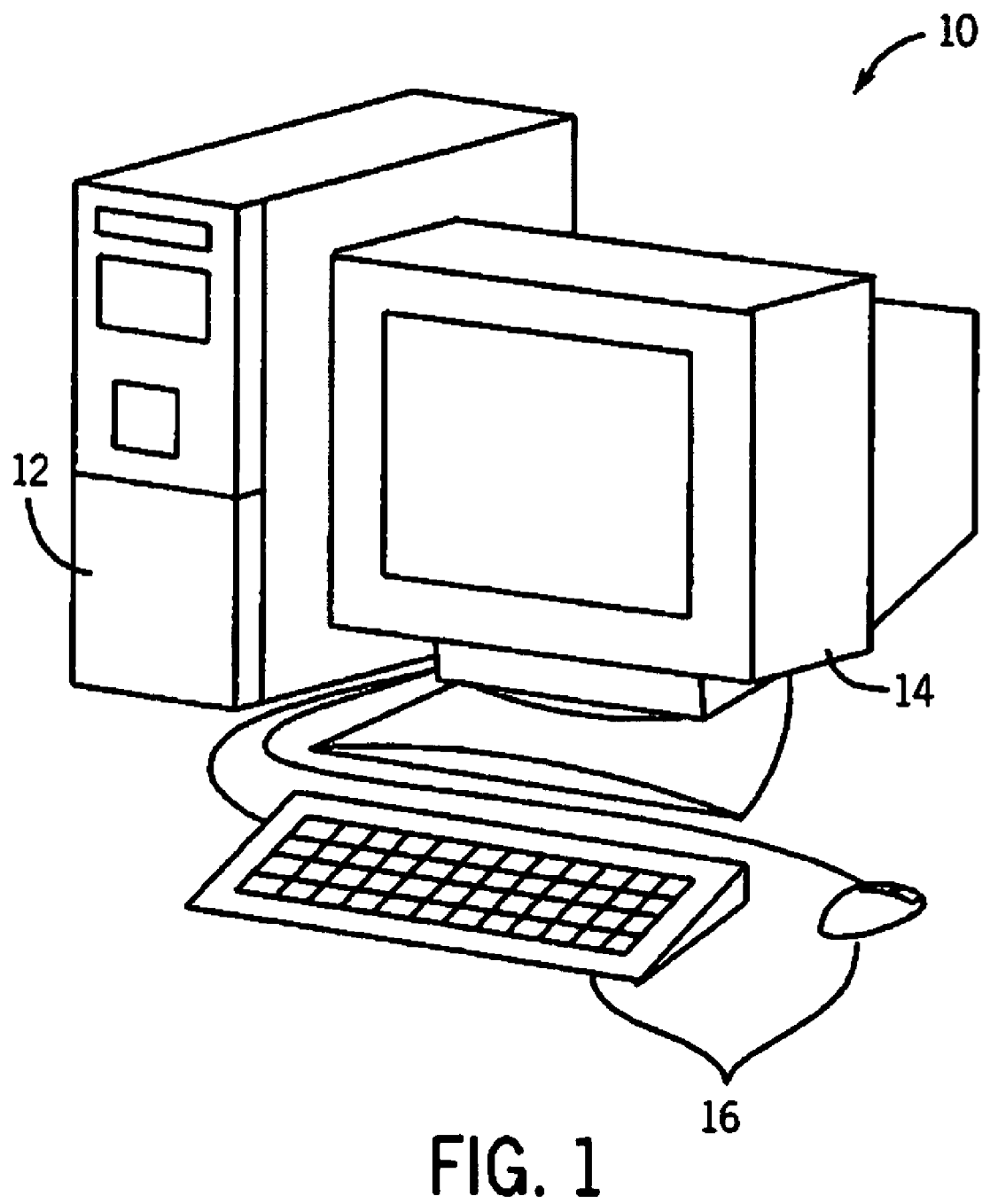
FIG. 1 is a schematic diagram illustrating a system for analyzing three-dimensional data in accordance with an embodiment.

Referring to FIG. 1, a schematic diagram illustrating a system 10 for analyzing three-dimensional image data is shown. According to an exemplary embodiment, the three-dimension image data may come from a computed tomography system. However, the three-dimensional image data may also be provided by a magnetic resonance imaging system, an ultrasound system, a positron emission computed tomography system, a nuclear medicine system, or from any other type of system capable of producing three-dimensional imaging data. The system 10 includes a processor 12, a visual output device 14 and an input device 16.

The processor 12 may comprise one or more microprocessors and the processor 12 is connected to the visual output device 14. According to an embodiment, the processor 12, may comprise a computer. The processor 12 may utilize software and/or firmware in order to perform a desired set of actions. The visual output device 14 is in electronic communication with the processor 12, and the visual output device 14 is capable of altering its display according to instructions from the processor 12. The visual output device 14 may comprise a monitor, a screen, a projector, or other device capable of visually presenting diagnostic images. According to an embodiment, the visual output device 14 may comprise multiple screens that are configured to display an output from the processor 12 at generally the same time.

The system 10 also includes the input device 16 in electronic communication with the processor 12. The input device 16 comprises an interface allowing an operator to control the processor 12, which in turn controls the output on the visual output device 14. The embodiment illustrated in FIG. 1 includes both a mouse and a keyboard as the input device 16. It should be understood that the input device 16 may comprise just the mouse or just the keyboard. Also, according to other embodiments, the input device 16 may comprise additional options such as a trackball or a touch screen.

Figure 2:
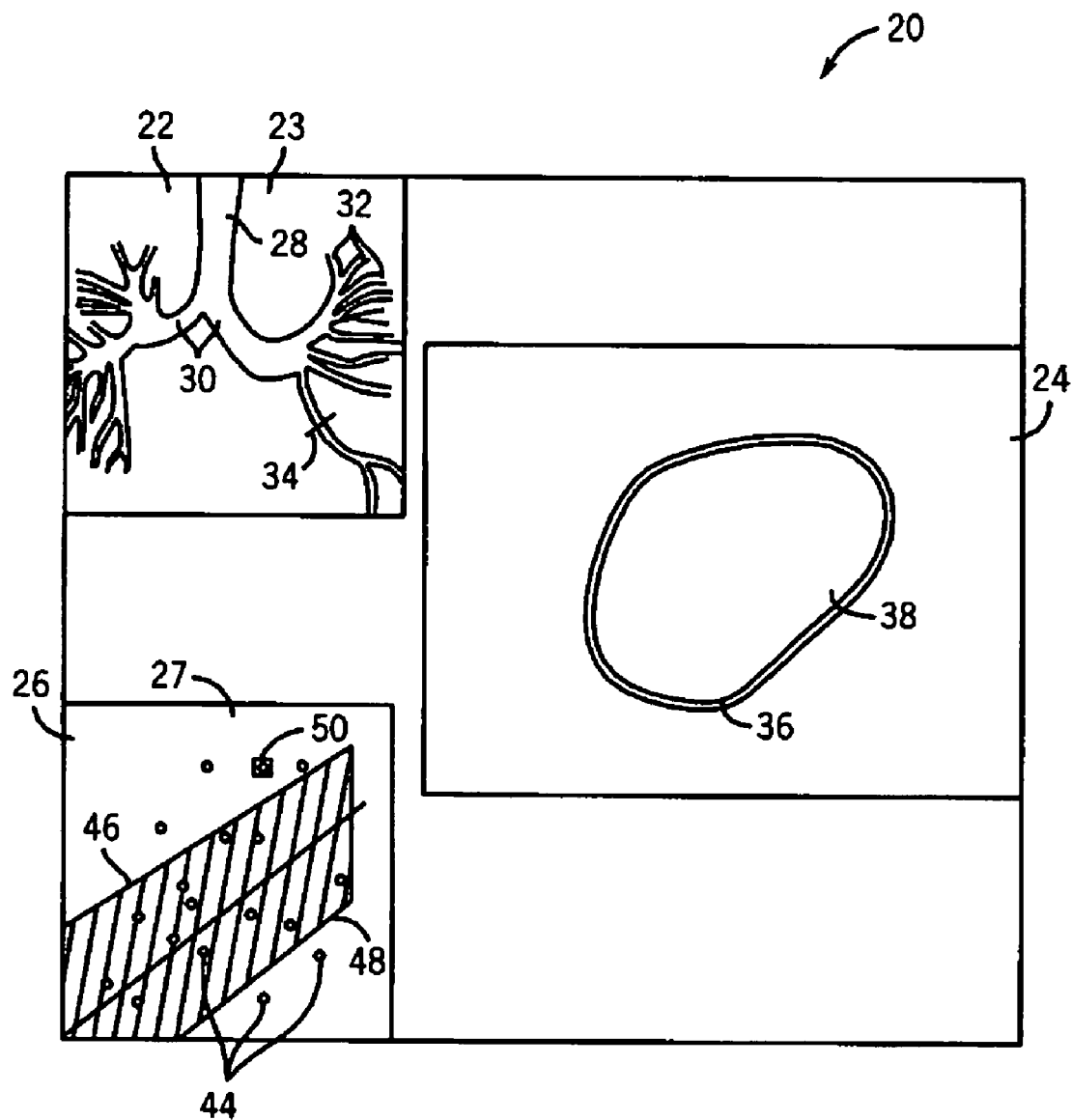
FIG. 2 is a schematic diagram illustrating a screen shot in accordance with an embodiment.

FIG. 2 is a schematic diagram illustrating a screen shot 20 from the visual output device 14 (shown in FIG. 1) in accordance with an embodiment. The screen shot 20 includes an overview image 22, a cross-sectional image 24 and a statistical image 26.

The overview image 22 may comprise a branching anatomical structure. According to an embodiment, the overview image 22 comprises a pulmonary tree image 23 including a plurality of branching passageways. The overview image 22 shown in FIG. 2 illustrates the entire pulmonary tree including a trachea 28, a pair of bronchi 30 and a plurality of bronchioles 32. It should be appreciated that according to other embodiments, only a portion of the pulmonary tree may be shown in the overview image 22. Additionally, according to other embodiments, the overview image 22 may illustrate an anatomical structure other than the pulmonary tree. For example, the overview image 22 may comprise a different branching structure such as a vessel tree showing a plurality of blood vessels. The overview image 22 may also comprise a cross-sectional marker 34 indicating the location of the cross-sectional view represented on the cross-sectional image 24. The interaction between the cross-sectional marker 34 and the cross-sectional image 24 will be discussed in detail hereinafter. While the cross-sectional marker 34 is depicted as a line in FIG. 2, it should be appreciated that the cross-sectional marker 34 may comprise a different form in other embodiments. For example, the cross-sectional marker 34 may comprise an object with a different shape, or the cross-sectional marker 34 may comprise a different way of visually identifying the location of the cross-sectional image 24 on the overview image 22. Embodiments may include using color or opacity as the cross-sectional marker 34.

Still referring to FIG. 2, the cross-sectional image 24 shows a representation of the cross-sectional view of the pulmonary tree image 23 at the location indicated by the cross-sectional marker 34. The cross-sectional image 24 in FIG. 2 comprises a cross-sectional view of a bronchiole. The cross-sectional image 24 includes a wall 36 and a lumen 38 defined by the wall 36.

The statistical image 26 may comprise either numerical or graphical information relating to a parameter value at a plurality of locations in the overview image 22. According to the embodiment shown in FIG. 2, the statistical image 26 comprises a scatter plot image 27 of a plurality of parameter values at multiple locations in the overview image 22. The statistical image 26 may show representations of parameter values for one or more parameters that have the potential to offer clinical insight into different locations of the structure represented in the overview image 22. A non-limiting list of parameters that may be represented on the statistical image 26 includes lumen area, airway diameter, wall area, and wall thickness. It should be appreciated that the statistical image may also show one parameter value versus another parameter value or the value of a ratio of parameter values associated with two separate parameters. Non-limiting examples of combinations of parameters that may be shown on the statistical image includes lumen area versus airway diameter, wall area versus airway diameter, wall ratio versus airway diameter, and airway diameter versus accompanying blood vessel diameter.

According to another embodiment, the statistical image 26 may comprise a list of one or more parameter values for a plurality of locations represented in the overview image 22. In addition, information such as a label or a set of RAS coordinates for each location may also be displayed in the statistical image 26. According to an embodiment, the list may be scrollable so that a user may scroll through values corresponding to a plurality of locations. The statistical image 26 may also contain parameter values corresponding to different points in time. For example, it may be useful to compare the same location over time in order to determine if the parameter value at a particular location has changed.

Additional embodiments may comprise displaying more than one statistical image 26 at generally the same time. For example, an embodiment may have a first statistical image (not shown) displaying parameter values in a graphical form and a second statistical image (not shown) displaying parameter values in a tabular form. It should be understood that additional embodiments may comprise a different combination of statistical images.

The overview image 22 may display a visual indicator (not shown) at a location on the overview image 22 corresponding to a location in the patient where one or more parameter values are outside of the expected range. According to an embodiment, the visual indicator may comprise using color, opacity, or shape in order to indicate the portion of the overview image 22 where the parameter value is outside of the expected range.

In the scatter plot image 27, a plurality of points 44 are plotted. The placement of each of the plurality of points 44 depends on one or more parameter values. In some embodiments, each of the plurality of points may be plotted based on two parameter values. According to an exemplary embodiment, each point represents one location of the anatomical structure shown in the overview image. For example, an x-axis of the scatter plot image 27 may represent one parameter while a y-axis represents another parameter. The system 10 (shown in FIG. 1) may allow the user to select which parameters are displayed on the statistical image 26. According to the embodiment shown in FIG. 2, the y-axis represents the total diameter while the x-axis represents the lumen diameter.

The statistical image 26 may also include a visual mark indicating if the parameter value at a particular location is outside of an expected range. The scatter plot image 27 shown in the embodiment depicted in FIG. 2 includes an upper limit line 46 and a lower limit line 48. All of the points that are within the upper limit line 46 and the lower limit line 48 represent locations where the parameter value or values are within the expected range. Points that are outside of the region bounded by the lower limit line 48 and the upper limit line 46 represent locations where the parameter value or values are outside of the expected range. A point 50 is an example where the parameter value is outside of the expected range. According to additional embodiments, the statistical image 26 may use other techniques to indicate that a point is outside of the expected range. For example, the statistical image 26 may show that the parameter value or values at a location is outside of the expected range through the use of color, shape, translucency, or other display techniques. According to an exemplary embodiment, points representing locations with a parameter value within the expected range may be displayed in the color green. Points representing locations with a parameter value outside of the expected range may be displayed in the color red. Optionally, the exemplary embodiment may display points representing parameter values that are close to the edge of the expected range in the color yellow.

Also, according to additional embodiments, the statistical image 26 may comprise representations other than the scatter plot image 27. For example, the statistical image 26 may comprise another type of graphical display such as a bar graph to display the parameter values. Also, the statistical image 26 may comprise one or more numerical representations of parameter values.

Figure 3:
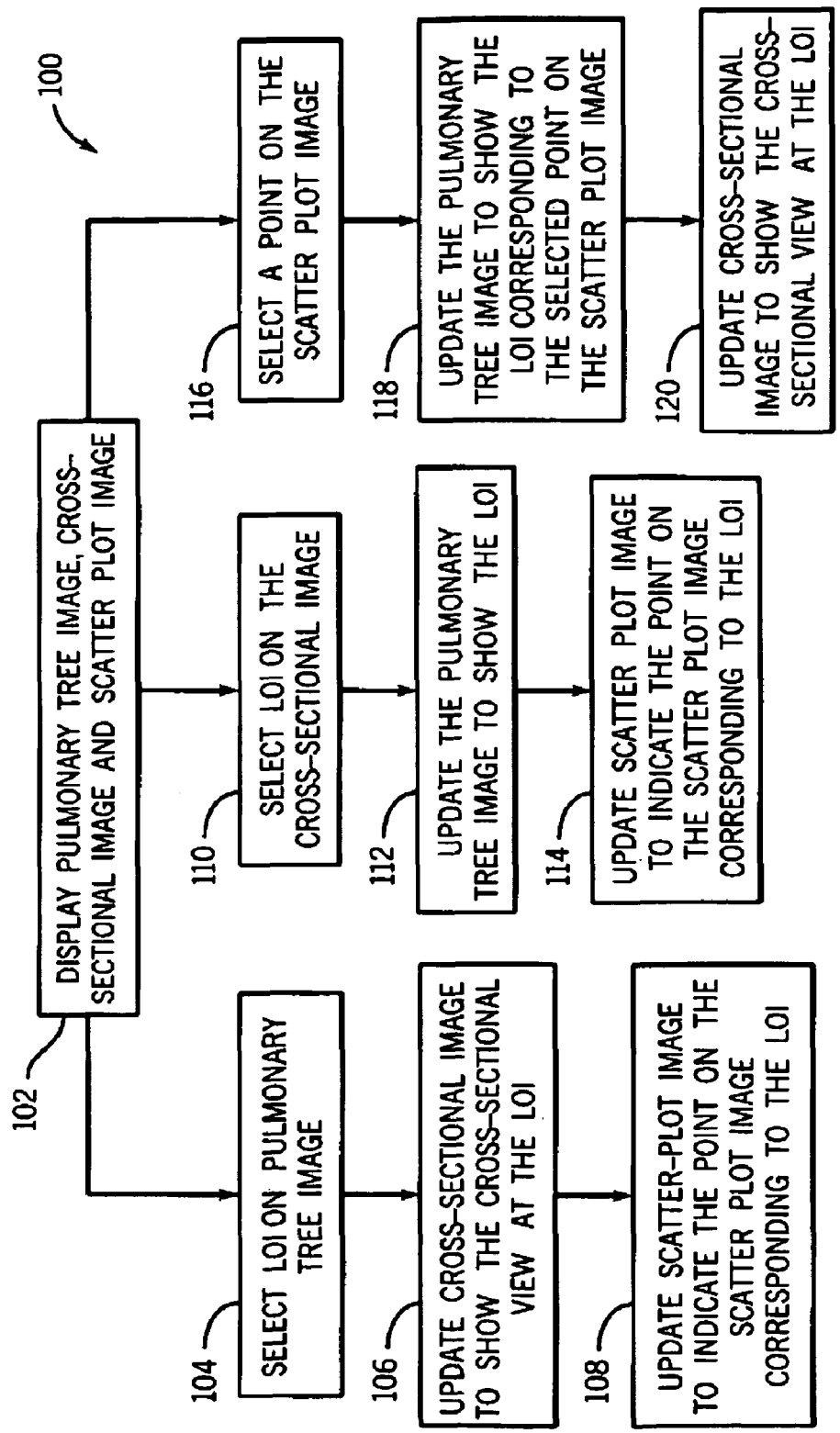
FIG. 3 is a flow chart illustrating a method in accordance with an embodiment.

FIG. 3 is a flow chart illustrating a method 100 in accordance with an embodiment. The individual blocks 102-120 represent steps that may be performed in accordance with the method 100. FIG. 3 includes three distinct sub-methods that may either be combined or implemented individually. Steps 102-120 of the method 100 need not be performed in the order shown.

Referring to FIG. 1, FIG. 2, and FIG. 3, at step 102, the pulmonary tree image 23, the cross-sectional image 24 and the scatter plot image 27 are displayed. At step 104, a user uses the input device 16 in order to select a location of interest, which will hereinafter be referred to as a LOI, on the pulmonary tree image 23. Selecting the LOI may comprise clicking a button on the user input device 16 while positioning a cursor on the LOI in the pulmonary tree image 23. At step 106, the cross-sectional image 24 is updated in order to show the cross-sectional view of the pulmonary tree image 23 at the LOI. According to the embodiment shown in FIG. 2, the cross-sectional image 24 shows the cross-sectional view of the pulmonary tree image 23 at the position indicated by the cross-sectional marker 34. The LOI is also indicated by the position of the cross-sectional marker 34 according to the exemplary embodiment shown in FIG. 2.

At step 108, the scatter plot image 27 is updated in order to show which of the plurality of points 44 corresponds to the LOI. According to an embodiment, the point 50 corresponds to the LOI. According to the embodiment shown, the point 50 has a box around it while all the other points are simply dots. The box around the point 50 indicates that it corresponds to the LOI. According to additional embodiments, points may be visually distinguished by other methods including the use of color or the use of shapes other than a box.

Still referring to FIG. 1, FIG. 2, and FIG. 3, at step 110, the user selects the LOI on the cross-sectional image 24. According to an embodiment, the user would use the input device 16 in order to page thorough cross-sectional views at different locations. For example, the input device 16 may allow the user to page both forward and backward from the cross-sectional view shown on the cross-sectional image 24. If the user decides to page forward, the cross-sectional image 24 would update to show a new cross-sectional view at a location on the pulmonary tree image 23 that is displaced in a first direction from the location of the cross-sectional view initially shown. If the user decides to page backwards, the cross-sectional image 24 would update to show a new cross-sectional view at a location on the pulmonary tree image 23 that is displaced in a second direction from the location of the cross-sectional view initially show. By paging forward or backward multiple times, the user is able to see cross-sectional views at a plurality of different locations.

At step 112, the pulmonary tree image 23 is updated so the cross-sectional marker 34 shows the location of the cross-sectional view being displayed in the cross-sectional image 24. At step 114, the scatter plot image 27 is updated to indicate the point on the scatter plot corresponding to the LOI. The point may be indicated by methods including those described during the discussion of step 108.

Still referring to FIG. 1, FIG. 2, and FIG. 3, at step 116 the user selects a point on the scatter plot image 27. The user may select the point by positioning the cursor on the point and clicking the button on the mouse. Once the point has been selected on the scatter plot image 27, the point may optionally be indicated on the scatter plot image 27 through techniques such as changing the size, color, or shape of the selected point.

At step 118, the pulmonary tree image 23 is updated in order to show the position of the LOI corresponding to the selected point on the scatter plot image 27. The location of the LOI may be indicated with a visual indicator, such as a color, or with the cross-sectional marker 34. At step 120, the cross-sectional image 24 is updated to show the cross-sectional view of pulmonary tree image 23 at the LOI.

The method 100 illustrates three separate sub methods: steps 104 through 108 are a first sub method, steps 110 through 114 are a second sub method, and steps 116 through 120 are a third sub method. It should be appreciated by those skilled in the art that embodiments of the invention may use any one of the sub methods illustrated in the method 100. Additionally, embodiments may use any combination of the sub methods in any order. For example, an embodiment may initially implement the third sub method and then implement the second sub method. Embodiments may also cycle through each sub method any number of times. According to an exemplary embodiment, the pulmonary tree image, the cross-sectional image and the scatter plot image may all be displayed at steps 102-120 during the method 100. The user may decide to cycle through each sub method any number of times in order to investigate or view different areas of the pulmonary tree.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A system for analyzing three-dimensional image data comprising:
   a processor, wherein the processor is configured to:
      generate an overview image of at least a portion of a patient;
      generate a cross-sectional image comprising a cross-sectional view of the overview image;
      generate a statistical image showing a parameter value relating to the portion of the patient shown in the overview image; and
   a visual output device connected to the processor, wherein the visual output device is configured to display the overview image, the cross-sectional image, and the statistical image generally simultaneously;
   wherein the overview image, the cross-sectional image, and the statistical image are interconnected such that an update, change, or input applied to any one of the images results in an update to one or more of the other images.

2. The system of claim 1, wherein the processor is further configured to generate the overview image comprising a pulmonary tree.

3. The system of claim 1, wherein the processor is further configured to generate the overview image comprising a vessel tree.

4. The system of claim 1, wherein the processor is further configured to generate a visual indicator for a location where the parameter value is outside of an expected range.

5. The system of claim 4, wherein the visual output device is further configured to display the visual indicator on the overview image.

6. The system of claim 1, wherein the processor is further configured to generate a cross-sectional marker representing the location of the cross-sectional image.

7. The system of claim 6, wherein the visual output device is further configured to display the cross-sectional marker on the overview image.

8. A system for analyzing three-dimensional image data comprising:
a processor, wherein the processor is configured to:
generate an overview image comprising a branching anatomical structure;
generate a cross-sectional image comprising a cross-sectional view of the overview image;
generate a statistical image comprising a representation of a parameter value at a plurality of locations in the branching anatomical structure; and
a visual output device connected to the processor, wherein the visual output device is configured to display the overview image, the cross-sectional image, and the statistical image generally simultaneously;
wherein the overview image, the cross-sectional image, and the statistical image are interconnected such that an update, change, or input applied to any one of the images results in an update to one or more of the other images.

9. The system of claim 8, wherein the processor is further configured to generate a visual mark for a parameter value that is outside of an expected range.

10. The system of claim 9, wherein the visual output device is further configured to display the visual mark on the statistical image.

11. The system of claim 8, wherein the processor is further configured to generate a visual indicator for a location where the parameter value is outside of an expected range.

12. The system of claim 11, wherein the visual output device is further configured to display the visual indicator on the overview image.

13. The system of claim 8, wherein the processor is further configured to generate the statistical image comprising a scatter plot.

14. The system of claim 8, wherein the processor is further configured to generate the statistical image comprising a bar graph.

15. A method of analyzing pulmonary image data for disease comprising:
displaying a pulmonary tree image representing a portion of a lung;
displaying a cross-sectional image at generally the same time as the pulmonary tree image, wherein the cross-sectional image comprises a cross-sectional view of the pulmonary tree image;
displaying a scatter plot image at generally the same time as the pulmonary tree image and the cross-sectional image, wherein the scatter plot image comprises a plurality of points and each of the plurality of points represents a parameter value at a specific location in the portion of the lung; and
selecting a location of interest on any one of the pulmonary tree image, the cross-sectional image, and the scatter plot image and automatically updating one or more of the other images.

16. The method of claim 15, further comprising displaying a visual indicator on the pulmonary tree image, wherein the visual indicator represents a location corresponding to one of the plurality of points in the scatter plot image.

17. The method of claim 15, further comprising editing a contour of the cross-sectional image.

18. The method of claim 15, wherein said displaying the scatter plot image comprises marking one of the plurality of points representing a value outside of an expected range of values.

19. The method of claim 15, wherein said selecting the location of interest comprises selecting one of the plurality of points on the scatter plot image.

20. The method of claim 15, wherein said selecting the location of interest comprises selecting the location of interest on the pulmonary tree image.

* * * * *